MAGNETIC STORAGE DEVICE WITH OPTICAL READOUT

Filed Nov. 10, 1966

INVENTOR.
GILBERT C. VORIE.
PETER KNOLL
BY Allen J. Jaffe
AGENT.

United States Patent Office 3,537,080

Patented Oct. 27, 1970

3,537,080
MAGNETIC STORAGE DEVICE WITH OPTICAL READOUT

Gilbert C. Vorie, Elma, N.Y., and Peter Knoll, Costa Mesa, Calif., assignors to Cornell Aeronautical Laboratory, Inc., Buffalo, N.Y., a corporation of New York Filed Nov. 10, 1966, Ser. No. 593,351
Int. Cl. G11c *11/06, 11/42;* G02f *1/22*
U.S. Cl. 340—174 2 Claims

ABSTRACT OF THE DISCLOSURE

A toroidal storage core of magnetically hard material having a discontinuity. A transparent magnetic readout material located in the discontinuity. Slots in the core adjacent the transparent magnetic material. Polarizing filters on opposite sides of the transparent magnetic material in line with the slots and a photo detector adjacent one of the polarizing filters.

The present invention relates to an improved magnetic storage device having a direct optical readout.

In many applications, it is desirable to obtain an optical signal that is indicative of information, either analog or digital, stored in magnetic material. For example, in optical computer processes a direct optical readout signal is to be preferred over an electrical readout that is subsequently converted to an optical signal. In addition to the costly conversion equipment involved in the latter type, cross coupling effects must be eliminated to obtain a readout that does not destroy or erase the original magnetic signal. With the present device cross coupling does not exist, since a direct optical readout is employed wherein the output is isolated from the input.

Another feature of the present invention is that the response is very rapid, such that simultaneous readin and readout is permitted, making the device particularly suitable as an electrical to optical relay or modulator.

It is accordingly an object of the present invention to provide a device capable of storing information in magnetic form and having means to convert said magnetic information directly into an optical signal.

Basically, the device of the present invention comprises a core of hard magnetic material as a storage element, the magnetization of which is controlled by an electrical input signal. The readout is accomplished by the variable attenuation of a polarized light wave travelling through a plate of transparent magnetic material inserted in a slot of the magnetic core. The light plane of polarization is rotated in the presence of the magnetic field, caused by the Faraday effect, to be discussed hereinbelow.

Figure 1:
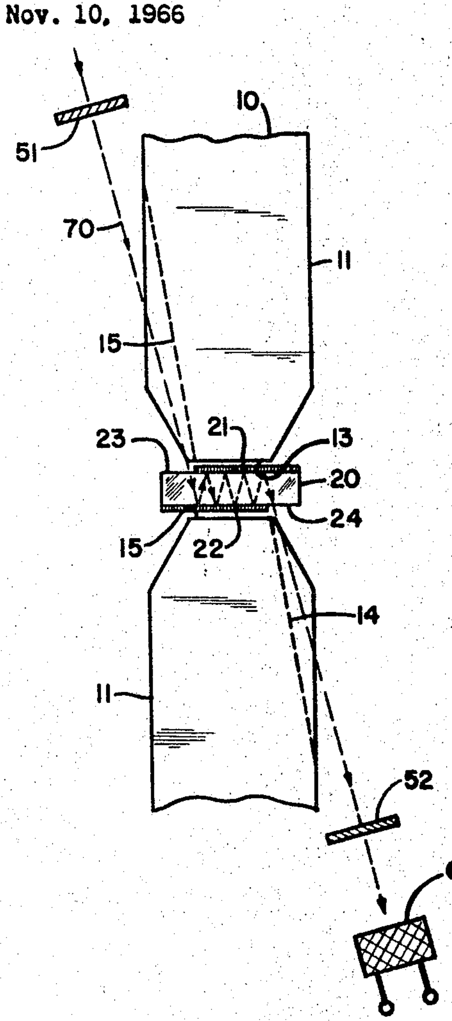
Figure 2:
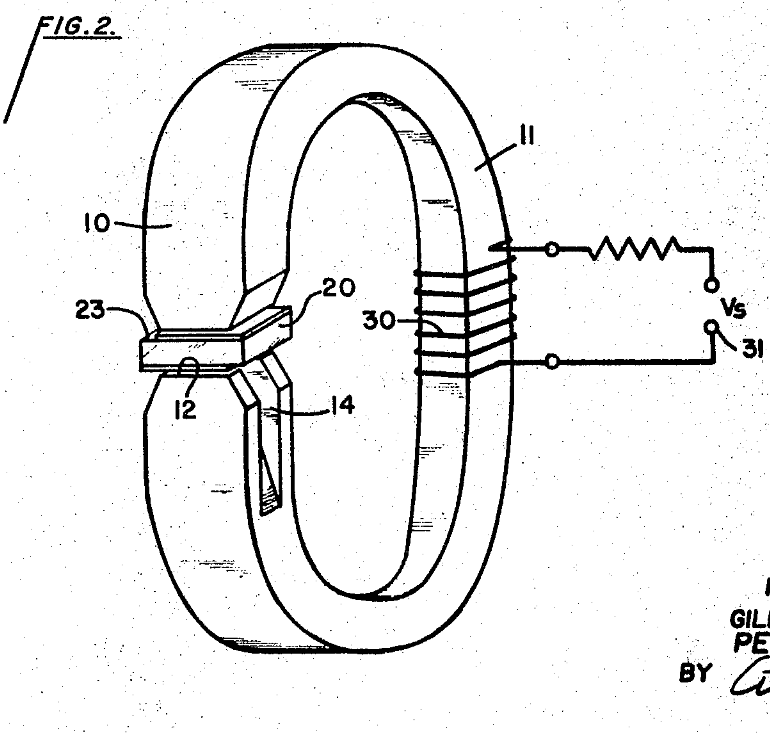

For a fuller understanding of the present invention reference may be had to the following detailed description of the same taken in conjunction with the accompanying drawing wherein:

FIG. 1 is a diagrammatic elevational view of a device constructed in accordance with the principles of the present invention, and FIG. 2 is a pictorial view of the apparatus of FIG. 1.

Referring now to the figures, the magnetic core storage element 10 is shown as being toroidal in shape having flat side walls 11. The magnetic core has a discontinuity forming a slot having walls 12 and 13. At wall 12 and adjacent the inner edge thereof, a slot 14 is angularly milled out of core 10. Similarly, at wall 13 and adjacent the outer edge thereof, a second slot 15 is angularly milled out of core 10. Magnetic core 10 is made of a suitable material that is magnetically hard, as for example, one of nickel-iron-aluminum or nickel-iron-aluminum-cobalt alloys. Inserted intermediate core walls 12 and 13 is an element 20 of optically transparent magnetic glass such as "Ferroglass" manufactured by Semi-Elements, Inc. Each end of the magnetic glass element contains a coating of light-reflecting material such as aluminum or silver. The coating 21 on the end adjacent core wall 13 extends from the inner edge of element 20 to a point short of the outer edge thereof adjacent milled slot 15, leaving a light entrance opening 23 therein. The coating 22 on the other end adjacent core wall 12 extends from the outer edge of element 20 to a point short of the inner edge thereof, adjacent milled slot 14, leaving a light exit opening 24 therein. An input coil 30 is wrapped around magnetic core 10 to vary the state of magnetization thereof in response to the signal $V_s$ across terminals 31.

In accordance with the Faraday effect, when plane polarized light is passed through a homogeneous medium along the direction of a magnetic field there is a rotation of the plane of polarization. The magnitude and direction of this magnetic rotation depend on the strength and direction of the field, but do not depend on the direction of propagation of the light through the field. In the Faraday effect the amount of rotation can be multiplied by successive reflections back and forth through the field. The Faraday effect is defined by the relationship $$\theta = VHL$$

where, $\theta$ is the amount of rotation,
H is the strength of the magnetic field,
L is the path length of light through the sample, and
V is the proportionality constant and is approximately proportional to the reciprocal of the square of the wavelength of the light.

A pair of polarizers 51 and 52 are arranged, respectively, in line with slots 15 and 14. A photoconductive cell 60 is arranged on that side of polarizer 52 opposite from core 10.

When core 10 is not magnetized and the two polarizing filters 51 and 52 are crossed 90° no light passes to photoconductive cell 60. Photocell 60 can function as an indicator or control element. As can be seen, a light beam 70 from a suitable source (not shown) passes through slot 15 and through entrance opening 23 of element 20 and is multiply reflected back and forth between reflecting surfaces 22 and 21 until it emerges through exit opening 24. These multiple reflections serve to increase the path length of the light through the "Ferroglass" which permits a greater rotation of the polarizing plane for a given magnetic field as pointed out earlier. In this way, the sensitivity of the device is increased. When the core is energized by an input signal $V_s$ across leads 31 the plane of polarization of the light will be rotated in the "Ferroglass" 20, the intensity of which passing through polarizing analyzer 52 is a function of the degree of magnetization of core 10. Thus, "Ferroglass" member 20 senses the degree of magnetization of core 10 and causes the beam of light to be rotated in accordance with the magnetization. Inasmuch as core 10 is of a magnetically hard material, thereby retaining the state of magnetization created by signal $V_s$, it is particularly suited as a storage element in computer processes.

As is apparent, the type of information stored in core 10 can be digital as well as analog quantities. For example, core 10 will function as an optical integrator when a series of pulses are impressed at input 31; the signal stored in core 10 thereby being the time integral of the input power.

It is intended that the invention is to be limited only by the scope of the appended claims.

What is claimed is:

1. A magnetic storage device, comprising;

(1) a toroidal magnetic core of a magnetically hard material, having a first slot therein and second and third slots, respectively, in an outer and inner surface thereof communicating with said first slot, (2) input means for varying the state of stored magnetization of said core, (3) an optically transparent magnetic material located in said first slot for sensing the state of magnetization of said core, (4) a pair of reflecting surfaces located on opposite sides of said optically transparent magnetic material to increase the path length of light passing therethrough, each of said reflecting surfaces terminating, respectively, short of said second and third slots, and (5) means responsive to said transparent magnetic material for developing an optical signal, the intensity of which is a function of the state of magnetization of said core.

2. In the magnetic storage device of claim 1 wherein; said means responsive to said transparent magnetic material comprises a pair of polarizing filters located respectively in front of said second slot and behind said third slot.

References Cited

UNITED STATES PATENTS

| | | | |
|---|---|---|---|
| 2,984,825 | 5/1961 | Fuller et al. | 340—174 |
| 2,485,839 | 10/1949 | O'Dea | 179—100.3 |

OTHER REFERENCES

Publication I, IBM Technical Disclosure Bulletin, vol. 5, No. 5, October 1962, pp. 76–77.

JAMES W. MOFFITT, Primary Examiner

U.S. Cl. X.R.

250—225, 230